United States Patent
Hittel et al.

(10) Patent No.: US 9,798,878 B1
(45) Date of Patent: Oct. 24, 2017

(54) SYSTEMS AND METHODS FOR DETECTING TEXT DISPLAY MANIPULATION ATTACKS

(71) Applicant: Symantec Corporation, Mountain View, CA (US)

(72) Inventors: Sean M. Hittel, Calgary (CA); Torrey Umland, Torrance, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/673,902

(22) Filed: Mar. 31, 2015

(51) Int. Cl.
  *G06F 11/00* (2006.01)
  *G06F 12/14* (2006.01)
  *G06F 12/16* (2006.01)
  *G08B 23/00* (2006.01)
  *G06F 21/56* (2013.01)
  *G06F 17/30* (2006.01)

(52) U.S. Cl.
  CPC ...... *G06F 21/565* (2013.01); *G06F 17/30106* (2013.01); *G06F 2221/034* (2013.01)

(58) Field of Classification Search
  CPC .............................. G08B 23/00; G06F 11/00
  USPC .................................................. 726/1, 24–25
  See application file for complete search history.

(56) References Cited

U.S. PATENT DOCUMENTS

| | | | | |
|---|---|---|---|---|
| 5,113,494 A | * | 5/1992 | Menendez | G06K 15/00 345/501 |
| 7,328,456 B1 | * | 2/2008 | Szor | G06F 21/56 713/165 |
| 7,448,085 B1 | | 11/2008 | Reyes et al. | |
| 7,620,992 B2 | | 11/2009 | Monastyrsky et al. | |
| 7,874,001 B2 | | 1/2011 | Beck et al. | |
| 8,499,354 B1 | | 7/2013 | Satish et al. | |
| 8,539,578 B1 | | 9/2013 | Zhou et al. | |
| 8,667,583 B2 | | 3/2014 | Polyakov et al. | |
| 8,769,685 B1 | * | 7/2014 | Conrad | G06F 21/562 726/23 |
| 8,776,218 B2 | | 7/2014 | Wright | |

(Continued)

FOREIGN PATENT DOCUMENTS

| | | | | |
|---|---|---|---|---|
| CN | 100462990 C | * | 2/2009 | ............ G06F 21/55 |
| EP | 2 492 833 A1 | | 8/2012 | |

OTHER PUBLICATIONS

English translation of Chinese Publication No. CN100462990 Application No. CN 200610105975 "Method and device for monitoring suspicious flie start" by Zhang et al. Pulished 2009.*

(Continued)

*Primary Examiner* — Dede Zecher
*Assistant Examiner* — Dereena Cattungal
(74) *Attorney, Agent, or Firm* — FisherBroyles, LLP (57) ABSTRACT

The disclosed computer-implemented method for detecting text display manipulation attacks may include (1) extracting a file name from a file that is under evaluation for malicious content, (2) inspecting, by a software security system, the file name for at least one control character that manipulates how the file name is displayed, (3) determining, based on inspecting the file name, that the file name includes the control character that manipulates how the file name is displayed, and (4) performing, by the software security system, a security action based at least in part on the determination that the file name includes the control character. Various other methods, systems, and computer-readable media are also disclosed.

20 Claims, 7 Drawing Sheets

(56) References Cited

U.S. PATENT DOCUMENTS

| | | | |
|---|---|---|---|
| 8,839,428 B1* | 9/2014 | Oliver | G06F 21/52 709/224 |
| 8,893,278 B1 | 11/2014 | Chechik | |
| 8,898,276 B1 | 11/2014 | Pimentel | |
| 8,898,775 B2* | 11/2014 | Ye | G06F 21/566 726/22 |
| 8,990,928 B1* | 3/2015 | Emigh | H04L 63/1441 726/22 |
| 9,043,786 B1 | 5/2015 | Hodge et al. | |
| 9,088,598 B1* | 7/2015 | Zhang | H04L 63/1408 |
| 9,483,643 B1 | 11/2016 | Yun | |
| 2002/0129264 A1* | 9/2002 | Rowland | H04L 63/102 726/26 |
| 2005/0265331 A1* | 12/2005 | Stolfo | G06F 21/552 370/389 |
| 2007/0038677 A1 | 2/2007 | Reasor et al. | |
| 2008/0027891 A1* | 1/2008 | Repasi | G06F 21/55 706/52 |
| 2008/0262990 A1 | 10/2008 | Kapoor et al. | |
| 2009/0126012 A1 | 5/2009 | Treadwell et al. | |
| 2009/0241192 A1 | 9/2009 | Thomas | |
| 2009/0328215 A1 | 12/2009 | Arzi et al. | |
| 2010/0031358 A1 | 2/2010 | Elovici et al. | |
| 2010/0077481 A1 | 3/2010 | Polyakov et al. | |
| 2010/0235913 A1* | 9/2010 | Craioveanu | G06F 21/563 726/23 |
| 2010/0251363 A1 | 9/2010 | Todorovic | |
| 2012/0079596 A1 | 3/2012 | Thomas et al. | |
| 2012/0278884 A1* | 11/2012 | Menoher | G06F 21/564 726/22 |
| 2012/0304244 A1 | 11/2012 | Xie et al. | |
| 2013/0139268 A1 | 5/2013 | An et al. | |
| 2013/0290732 A1* | 10/2013 | Branton | H04L 9/0863 713/189 |
| 2013/0298201 A1 | 11/2013 | Aravindakshan et al. | |
| 2013/0312098 A1 | 11/2013 | Kapoor et al. | |
| 2013/0347052 A1 | 12/2013 | Choudrie | |
| 2014/0049554 A1* | 2/2014 | Chen | G09G 5/377 345/589 |
| 2014/0082751 A1 | 3/2014 | Vipat et al. | |
| 2014/0137180 A1 | 5/2014 | Lukacs et al. | |
| 2014/0165203 A1 | 6/2014 | Friedrichs et al. | |
| 2014/0199664 A1 | 7/2014 | Sadeh-Koniecpol et al. | |
| 2015/0007312 A1 | 1/2015 | Pidathala et al. | |
| 2015/0020203 A1 | 1/2015 | Xie et al. | |
| 2015/0052611 A1* | 2/2015 | Wang | G06F 21/561 726/24 |
| 2015/0101049 A1 | 4/2015 | Lukacs et al. | |
| 2015/0379264 A1* | 12/2015 | Alme | G06F 21/564 726/23 |
| 2016/0034950 A1* | 2/2016 | Schroeder | H04L 63/1441 705/14.47 |

OTHER PUBLICATIONS

"How Hackers can disguise malicious programs with fake file extensions" by Hoffman published Oct 24, 2012.*

Joseph Chen; Systems and Methods for Leveraging Existing Client Computing Environments as Simulated Threat Ecosystems; U.S. Appl. No. 14/290,303, filed May 29, 2014.

James Yun; Systems and Methods for Creating Behavioral Signatures Used to Detect Malware; U.S. Appl. No. 14/656,739, filed Mar. 13, 2015.

James Yun; Systems and Methods for Detecting Potentially Malicious Applications; U.S. Appl. No. 14/656,741, filed Mar. 13, 2015.

James Yun; Systems and Methods for Detecting Potentially Malicious Files; U.S. Appl. No. 14/666,337, filed Mar. 24, 2015.

"Antivirus software", http://en.wikipedia.org/wiki/Antivirus_software, as accessed Jan. 16, 2015, Wikipedia, (Mar. 15, 2004).

"Common Malware Types: Cybersecurity 101", https://www.veracode.com/blog/2012/10/common-malware-types-cybersecurity-101, as accessed Jan. 16, 2015, Veracode, (Oct. 12, 2012).

"URLDownloadToFile function", https://msdn.microsoft.com/en-us/library/ie/ms775123(v=vs.85).aspx, as accessed Jan. 16, 2015, Microsoft, (on or before Jan. 16, 2015).

"How to use the URLDownloadToFile() Function???", http://www.cplusplus.com/forum/windows/107840/, as accessed Jan. 16, 2015, (Aug. 2, 2013).

"Should I use URLDownloadToFile?", http://stackoverflow.com/questions/5184988/should-i-use-urldownloadtofile, as accessed Jan. 16, 2015, (Mar. 3, 2011).

"URLDownloadToCacheFile function", https://msdn.microsoft.com/en-us/library/ie/ms775122(v=vs.85).aspx, as accessed Jan. 16, 2015, Microsoft, (on or before Jan. 16, 2015).

Su, Chen "Download a File Using URLDownloadToCacheFile", http://www.codeproject.com/Articles/3096/Download-a-File-Using-URLDownloadToCacheFile, as accessed Jan. 16, 2015, (Oct. 25, 2002).

"System call", http://en.wikipedia.org/wiki/System_call, as accesses Jan. 16, 2015, Wikipedia, (Jun. 17, 2004).

"How do antiviruses scan for thousands of malware signatures in a short time?", http://security.stackexchange.com/questions/30362/how-do-antiviruses-scan-for-thousands-of-malware-signatures-in-a-short-time, as accessed Jan. 16, 2015, (Feb. 6, 2013).

Martin, Luther "A clever use for U+202E", http://www.voltage.com/blog/standards/a-clever-use-for-u202e/, as accessed Jan. 16, 2015, Blog, HP Security Voltage, (Jun. 7, 2011).

* cited by examiner

SYSTEMS AND METHODS FOR DETECTING TEXT DISPLAY MANIPULATION ATTACKS

BACKGROUND

Many targeted digital attacks rely on tricking users into executing malicious code. As users become increasingly aware that file extensions such as ".exe" might indicate a potential threat, attackers are resorting to more devious methods by which they attempt to manipulate users into executing malicious code. In some examples, an attacker may use various methods of hiding the ".exe" file extension from the end user. Such an attack may cause the malicious file to appear as though it were a harmless file type, such as an ADOBE PORTABLE DOCUMENT FORMAT (PDF) file type, especially when used in conjunction with other methods of attack.

Unfortunately, traditional methods of detecting malicious files may fail to identify certain methods of disguising malicious files. Moreover, most users have legitimate reasons for sending or opening executable files. Instituting a blanket prohibition on the transfer or use of such files may interfere with user communications or a user's ability to operate their computing device. Moreover, manual inspection of malicious files is both inefficient and prone to human error. The instant disclosure, therefore, identifies and addresses a need for additional and improved systems and methods for identifying malicious files.

SUMMARY

As will be described in greater detail below, the instant disclosure describes various systems and methods for detecting text display manipulation attacks by, for example, identifying the presence of a control character that manipulates the manner in which a file name is displayed. In one example, a computer-implemented method for detecting text display manipulation attacks may include (1) extracting a file name from a file that is under evaluation for malicious content, (2) inspecting, using a software security system, the file name for a control character that manipulates how the file name is displayed, (3) determining that the file name includes the control character that manipulates how the file name is displayed, and (4) performing a security action based at least in part on the determination that the file name includes the control character. In some examples, the computer-implemented method may further include extracting the file name in response to (1) a user attempting to access the file, (2) a user downloading the file, and/or (3) a security scan examining the file.

In one embodiment, the control character may include a UNICODE bi-directional control character. In another embodiment, the substring may include multiple aggregated file extensions, a file extension not located at the end of the file name, and/or a reversed file extension.

In some examples, performing the security action may be further based on a determination that the file name includes a substring that is categorized as associated with malicious files. In other examples, performing the security action may be further based on a determination that the substring matches an entry in a database that contains a list of substrings that are known to be included in the names of malicious files. Additionally or alternatively, performing the security action may be based on a determination that the substring matches a regular expression that represents substrings known to be included in the names of malicious files.

In further examples, performing the security action may be based on a determination that the file name is written in a language that is categorized as being not associated with control characters. In some embodiments, languages that are associated with control characters may include: (1) Hebrew, (2) Chinese, (3) Korean, (4) Japanese, and/or (5) Arabic. In some embodiments, performing the security action may include (1) preventing the file from executing, (2) alerting a user that the file presents a security risk, and/or (3) deleting the file.

In one embodiment, a system for implementing the above-described method may include (1) an extraction module, stored in memory, that extracts a file name from a file that is under evaluation for malicious content, (2) an inspection module, stored in memory, that inspects, through a software security system, the file name for a control character that manipulates how the file name is displayed, (3) a determination module, stored in memory, that determines that the file name includes the control character that manipulates how the file name is displayed, (4) a security module, stored in memory, that performs, through the software security system, a security action based at least in part on the determination that the file name includes the control character, and (5) at least one physical processor configured to execute the extraction module, the inspection module, the determination module, and the security module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) extract a file name from a file that is under evaluation for malicious content, (2) inspect, using a software security system, the file name for at least one control character that manipulates how the file name is displayed, (3) determine, based on inspecting the file name, that the file name includes the control character that manipulates how the file name is displayed, and (4) perform, by the software security system, a security action based at least in part on the determination that the file name includes the control character.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for detecting text display manipulation attacks. As will be explained in greater detail below, the systems and methods described herein may enable a digital security system to identify control characters that are used in contexts not typically associated with the presence of control characters. Accordingly, the disclosed techniques may enable digital security systems to identify text display manipulation attacks.

Figure 1:
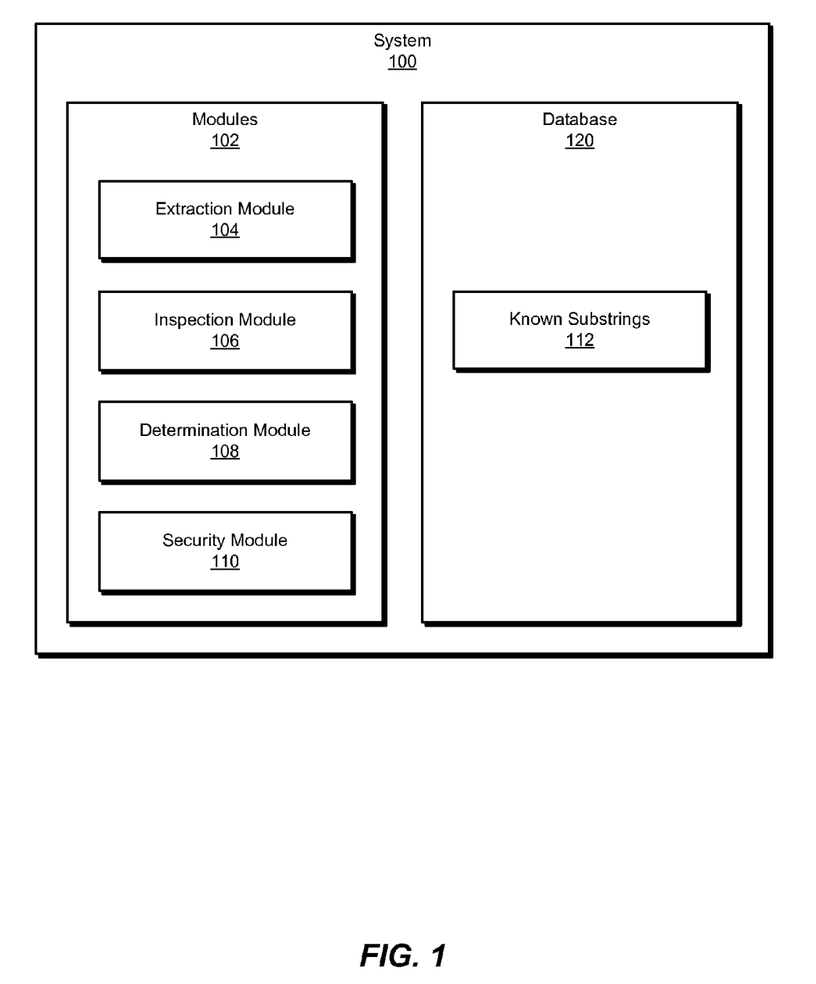
FIG. 1 is a block diagram of an exemplary system for detecting text display manipulation attacks.
Figure 2:
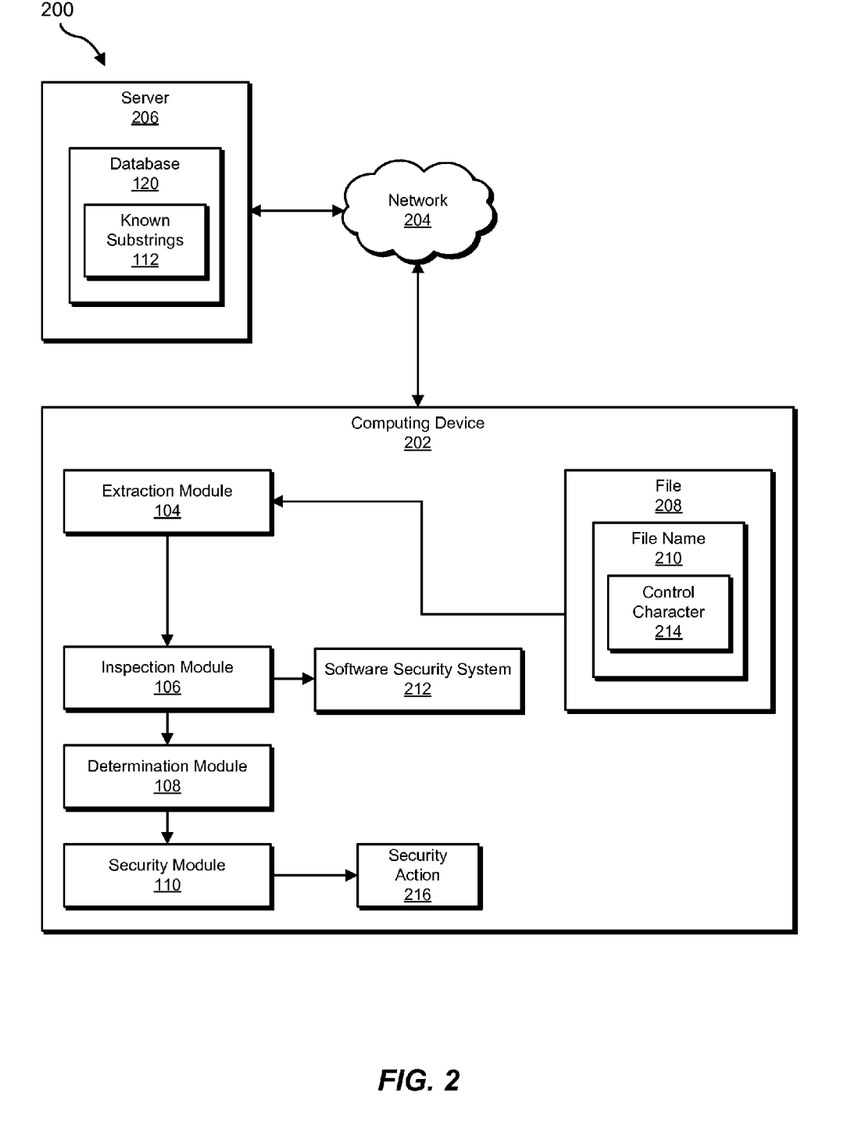
FIG. 2 is a block diagram of an additional exemplary system for detecting text display manipulation attacks.

The following will provide, with reference to FIGS. 1-2, detailed descriptions of exemplary systems for detecting text display manipulation attacks. Detailed descriptions of corresponding computer-implemented methods will also be provided in connection with FIGS. 3-5. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for detecting text display manipulation attacks. As illustrated in this figure, exemplary system 100 may include one or more modules 102 for performing one or more tasks. For example, and as will be explained in greater detail below, exemplary system 100 may also include an extraction module 104 that may extract a file name from a file that is under evaluation for malicious content. Additionally, exemplary system 100 may include an inspection module 106 that may inspect the file name for a control character that manipulates how the file name may be displayed. Exemplary system 100 may also include a determination module 108 that may determine, based on inspecting the file name, that the file name includes the control character that manipulates how the file name may be displayed. Exemplary system 100 may further include a security module 110 that may perform a security action based at least in part on the determination that the file name includes the control character. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store a list of substrings that are known to be contained in the file names of malicious files.

Database 120 may represent portions of a single database or computing device or a plurality of databases or computing devices. For example, database 120 may represent a portion of server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as server 206 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, enable computing device 202 and/or server 206 to identify files that manipulate the display of the file name in an attempt to encourage users to open the file. For example, extraction module 104 may extract a file name 210 from a file 208 that is under evaluation for malicious content. Inspection module 106 may inspect, through a software security system 212, file name 210 for the presence of a control character 214 that manipulates how file name 210 is displayed. Determination module 108 may determine, based on inspecting file name 210, that file name 210 includes control character 214. Security module 110 may perform a security action 216 based at least in part on the determination that file name 210 includes control character 214.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Server 206 generally represents any type or form of computing device that is capable of storing a list of substrings known to appear in the names of malicious files. Additionally or alternatively, server 206 may represent any type or form of computing device that is capable of extracting and inspecting file names. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Software security system 212 generally represents any type or form of software that is written with the purpose of preventing a computing system from executing malicious code. Software security system 212 may be executed by any suitable computing device, such as computing device 202 and/or server 206 in FIG. 2, exemplary computing system 610 in FIG. 6, or any other suitable computing device. Examples of software security system 212 include, without limitation, antivirus software, e-mail scanning software, firewall software, combinations of one or more of the above, or any other suitable software that prevents a computing system from executing malicious code.

Figure 3:
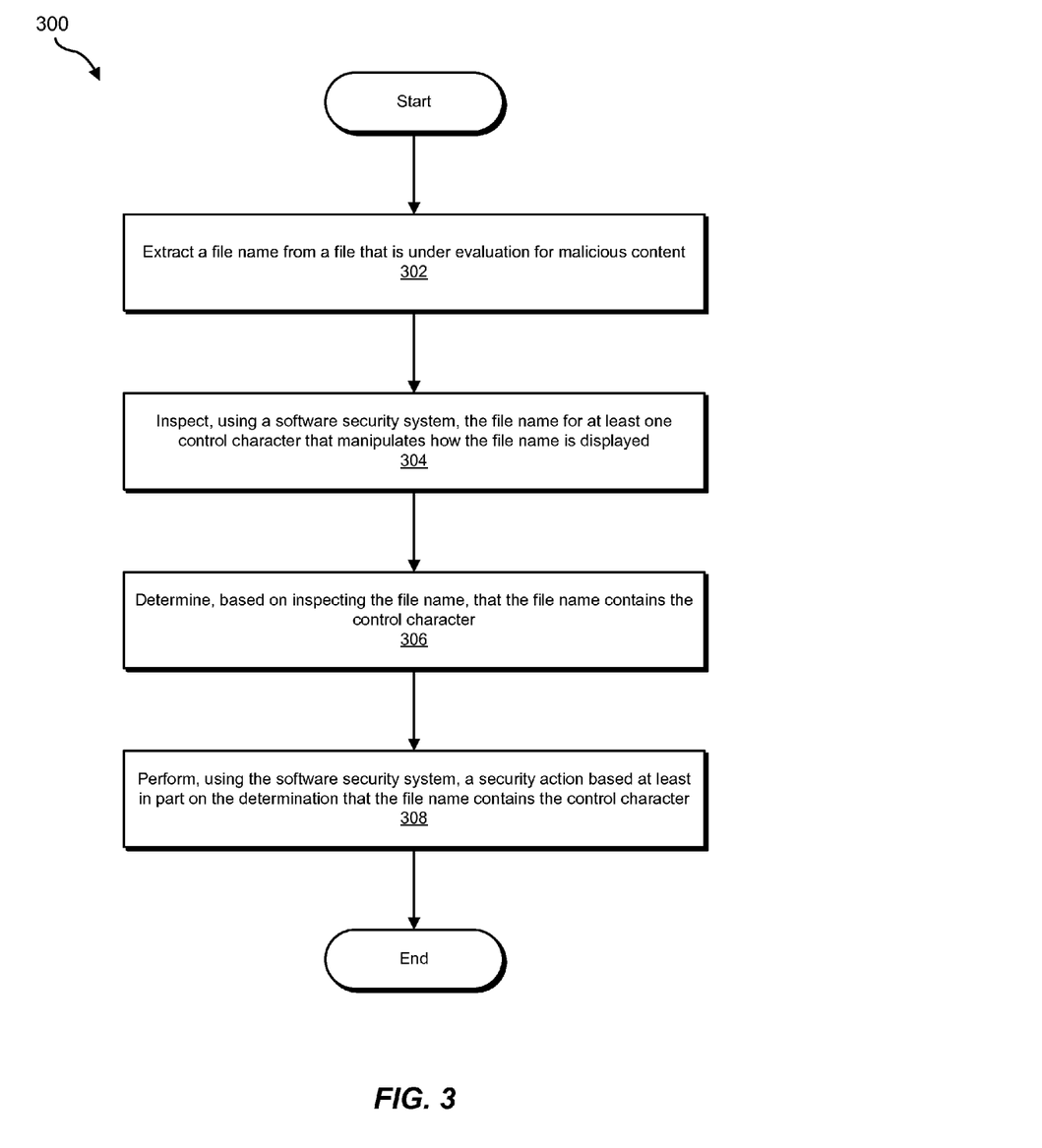
FIG. 3 is a flow diagram of an exemplary method for detecting text display manipulation attacks.

FIG. 3 is a flow diagram of an exemplary computer-implemented method 300 for detecting text display manipulation attacks. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may extract a file name from a file that is under evaluation for malicious content. For example, extraction module 104 may, as part of computing device 202 in FIG. 2, extract file name 210 from file 208 that is under evaluation for malicious content.

The term "file name," as used herein, generally refers to a name by which an operating system refers to a particular file. File names generally include alphanumeric characters and other symbols. As will be discussed in greater detail below, some file names may contain special characters (e.g., control characters) that direct operating systems or applications to alter the manner in which the file name is displayed to a user.

Extraction module 104 may extract file name 210 from file 208 in a variety of ways. In some examples, extraction module 104 may use a script written in a programming language, such as PYTHON. In other examples, extraction module 104 may request the file name 210 from an operating system that hosts file 208. In some embodiments, extraction module 104 may extract the file name in response to a user attempting to access the file, a user downloading the file, and/or a security scan examining the file.

At step 304, one or more of the systems described herein may inspect, by a software security system, the file name for a control character that manipulates how the file name is displayed. For example, inspection module 106 may, as part of computing device 202 in FIG. 2, inspect, through software security system 212, file name 210 for at least one control character 214 that manipulates how file name 210 is displayed.

The term "control character," as used herein, generally refers to specialized characters that themselves may not be displayed but that do instruct operating systems or applications to alter how visible text in a string is displayed. In some embodiments, the control character may be a UNICODE bi-directional control character (e.g, [+U202e] or "RIGHT-TO-LEFT OVERRIDE"). In these embodiments, the control character may cause an operating system or other system to display a segment of text from right-to-left, rather than the typical left-to-right. For example, the string "[+U202e] ABCD" will display to a user as "DCBA". As a second example, the string "123[+U202e]456" will display to a user as "123654". Although the systems and methods described herein focus on [+U202e], attackers may use any number and/or types of control characters alone or in combination to disguise file names. Character sets other than UNICODE may include their own unique sets of control characters. Attackers may use control characters to disguise file names, as described above.

Figure 4:
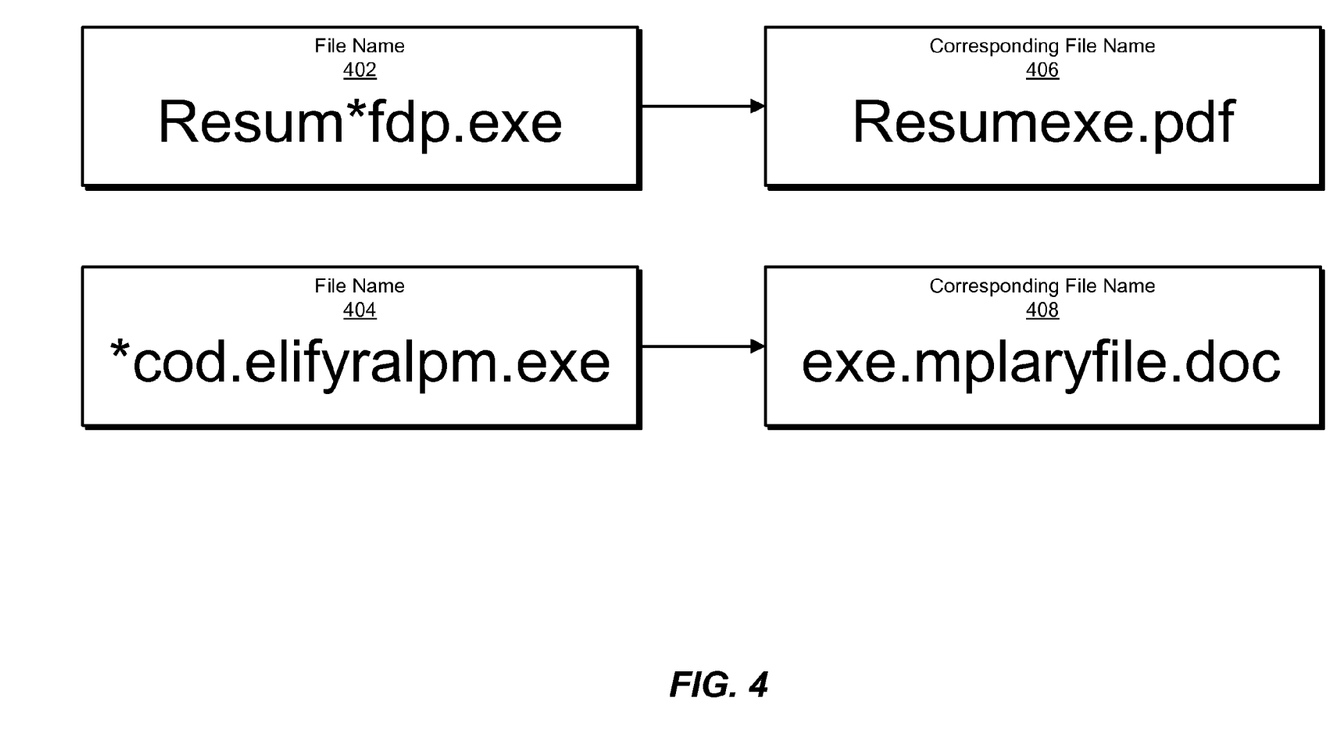
FIG. 4 is a block diagram of exemplary file names that represent text display manipulation attacks.

In some examples of an attacker using a control character to disguise a file name, and with reference to FIG. 4, an attacker may use control characters to hide the "executable" (".exe") file extension from a file name. In the example of FIG. 4, the asterisk ("*") represents a control character that causes operating systems or other systems to display a string of characters in right-to-left order, such as the "[+U202e]" character described above. An attacker may attempt to disguise a malicious executable file as a resume document formatted in the ADOBE PORTABLE DOCUMENT FORMAT ("PDF"). PDF documents generally use the ".pdf" file extension. In this example, the attacker may write a file name 402 such that the control character designates the substring "fdp.exe" to be displayed in reverse order. Because operating systems or other systems do not generally display control characters to end users or targets of such an attack, users may see file name 402 displayed as a corresponding file name 406, or "Resumexe.pdf". Because PDF files generally use the ".pdf" file extension, and because the last three letters of corresponding file name 406 appear to be "pdf," users may accordingly (and erroneously) believe that corresponding file name 406 represents a PDF document.

In a second example, and with continuing reference to FIG. 4, an attacker may disguise a malicious executable as a MICROSOFT WORD document by using a file name 404. Such documents typically use the ".doc" file extension. In the example of file name 404, the control character is at the beginning of the file name, causing the entire string to be reversed. Such reversal effectively hides the ".exe" file extension in plain sight. Users may view file name 404 as corresponding file name 408, which appears to be a MICROSOFT WORD document using the standard ".doc" file extension.

As a further example, users may occasionally configure their operating systems to hide file extensions. An attacker targeting such a user may use a file name such as "resume*fdp..exe" to convince such a user to open the file. In this particular example, the operating system may hide the file extension ".exe" in accordance with the user-designated configuration, causing the file name that will be displayed to be stored in memory as "resume*fdp.". Because this string includes a display override control character (described above as [+U202e]), the file name may display the characters after the control character in right-to-left order, thus causing the file name to display to the end user as "resume.pdf".

Inspection module 106 may inspect the file name for the control character in a variety of ways. In some embodiments, inspection module 106 may simply inspect file name 210 for the presence of control character 214. In other embodiments, inspection module 106 may inspect file name 210 for both control character 214 and substrings contained in a database (e.g., database 120 in FIG. 2) that contains substrings known to be associated with the names of malicious files.

Returning to FIG. 3 at step 306, one or more of the systems described herein may determine, based on inspecting the file name, that the file name includes the control character that manipulates how the file name is displayed. For example, determination module 108 may, as part of computing device 202 in FIG. 2, determine, based on inspecting file name 210, that file name 210 includes control character 214 that manipulates how file name 210 is displayed.

Determination module 108 may determine that file name 210 contains control character 214 in a variety of ways. In some embodiments, determination module 108 may match control character 214 to a corresponding regular expression. In other embodiments, determination module 108 may search file name 210 for characters that match items listed in a database (e.g., database 120 in FIG. 2). However, in some contexts, the mere fact that a file name contains a control character may not be sufficient to categorize a file as malicious. Therefore, in some embodiments, determination module 108 may additionally determine that file name 210 contains a substring that is categorized as associated with malicious files (e.g., a substring and metadata/location pair, where the combination of the substring and the metadata or location, such as a position within the file name, is associated with malicious files).

In some examples, determination module 108 may determine that the substring matches a regular expression that represents substrings known to be included in the names of malicious files. In other examples, determination module 108 may determine that the substring matches an entry in a database that contains a list of substrings that are known to be included in the names of malicious files. The substring may take a variety of forms. Examples of substrings known to be included in the names of malicious files include, without limitation, multiple different file extensions (e.g., the string "pdf.doc.exe" represents three different file extensions), a file extension located at a position other than the end of the file name, and a reversed file extension (e.g., a malicious file may contain the string, "fdp" as part of deceiving a user into believing the file has the previously discussed "pdf" file extension). A substring may be associated with malicious files if: (A) it matches a file extension associated with malicious files, (B) it matches a file extension associated with malicious and non-malicious files, but is located before the end position of the file name, (C) it matches a reversed file name extension, and/or (D) it includes a series of characters delineated by a period (e.g., an extra period, in addition to the period before the true file extension) or similar character (e.g., comma, colon, semicolon, etc.) on one or both sides of the substring. The software security system may weigh each of these factors the same or differently when evaluating a safety score for the file and/or comparing the safety score to a safety threshold.

Figure 5:
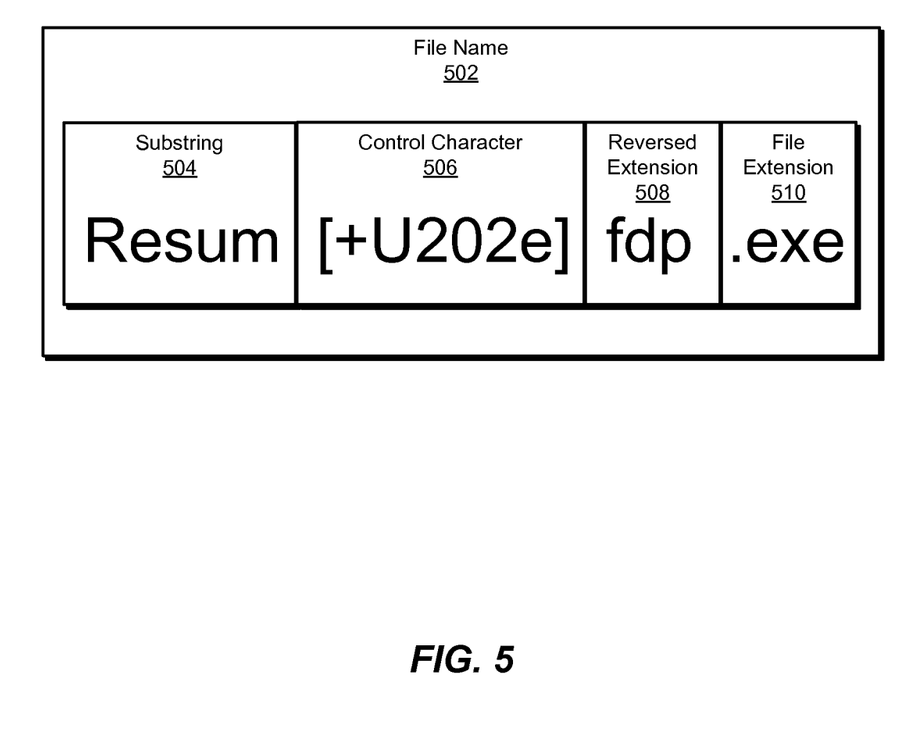
FIG. 5 is a block diagram of an exemplary system for detecting text display manipulation attacks.

As an illustrative example and with reference to FIG. 5, systems described herein may extract and inspect a file name 502 from a file that is under evaluation for malicious content. Determination module 108 may determine that file name 502 contains control character 506, and accordingly prompt security module 110 to undertake a security action. Additionally or alternatively, determination module 108 may identify a substring 504 as a substring contained within file names that are generally associated with malicious files by comparing substring 504 to known substrings 112 (illustrated as part of database 120 in FIG. 2). Further, determination module 108 may identify a reversed extension 508 within file name 502. As described above, reversed file extensions within a file name may be indicative that the associated file contains malicious content. In some embodiments, determination module 108 may determine that file name 502 contains a file extension 510. Note that file extension 510 represents the file extension of the file as viewed by an operating system rather than what an end user may perceive the file extension to be.

In other contexts, a file may have a legitimate reason for containing a control character. Some world languages may require the use of control characters in order to ensure that text is properly displayed. Examples of languages that are associated with control characters include, without limitation, Hebrew, Chinese, Korean, Japanese, and Arabic. Other languages, such as the English language, rarely if ever use control characters within file names. The presence of a control character within the file name written in such languages may be an indicator that the corresponding file contains malicious content. Accordingly, in some examples, determination module 108 may determine that the file name is written in a language that is categorized as being not associated with control characters (e.g., as another basis or factor for determining to perform a security action).

At step 308, one or more of the systems described herein may perform a security action based at least in part on the determination that the file name includes the control character. For example, security module 110 may, as part of computing device 202 in FIG. 2, perform, through software security system 212, security action 216 based at least in part on the determination that file name 210 includes the control character.

Security module 110 may perform security action 216 based on a variety of information. As described above, determination module 108 may determine that a file name contains a control character. Additionally, determination module 108 may determine that a file name contains substrings known to be contained within the file names of malicious files, contains reversed file extensions, contains multiple file extensions, and/or is written in a language that is not typically associated with the use of control characters. Security module 110 may perform security action 216 based on any of the above factors, alone or in combination. Examples of security action 216 include, without limitation, preventing the file from executing, alerting a user that the file presents a security risk, and/or deleting or quarantining the file.

As described above, the systems and methods described herein may enable a digital security system to identify control characters that are used in contexts not typically associated with the presence of control characters. Accordingly, the systems and methods described herein may enable such digital security systems to identify text display manipulation attacks.

Figure 6:
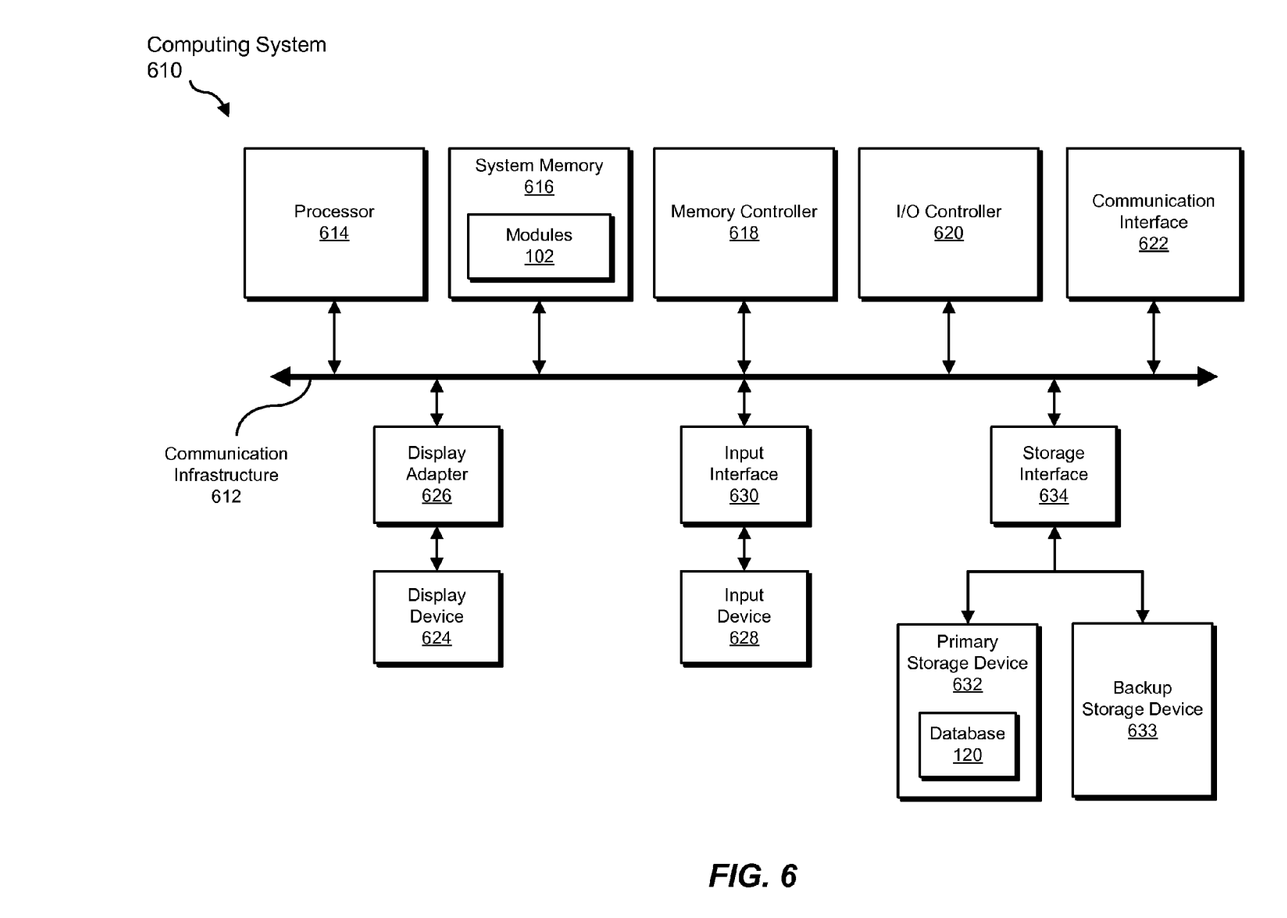
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
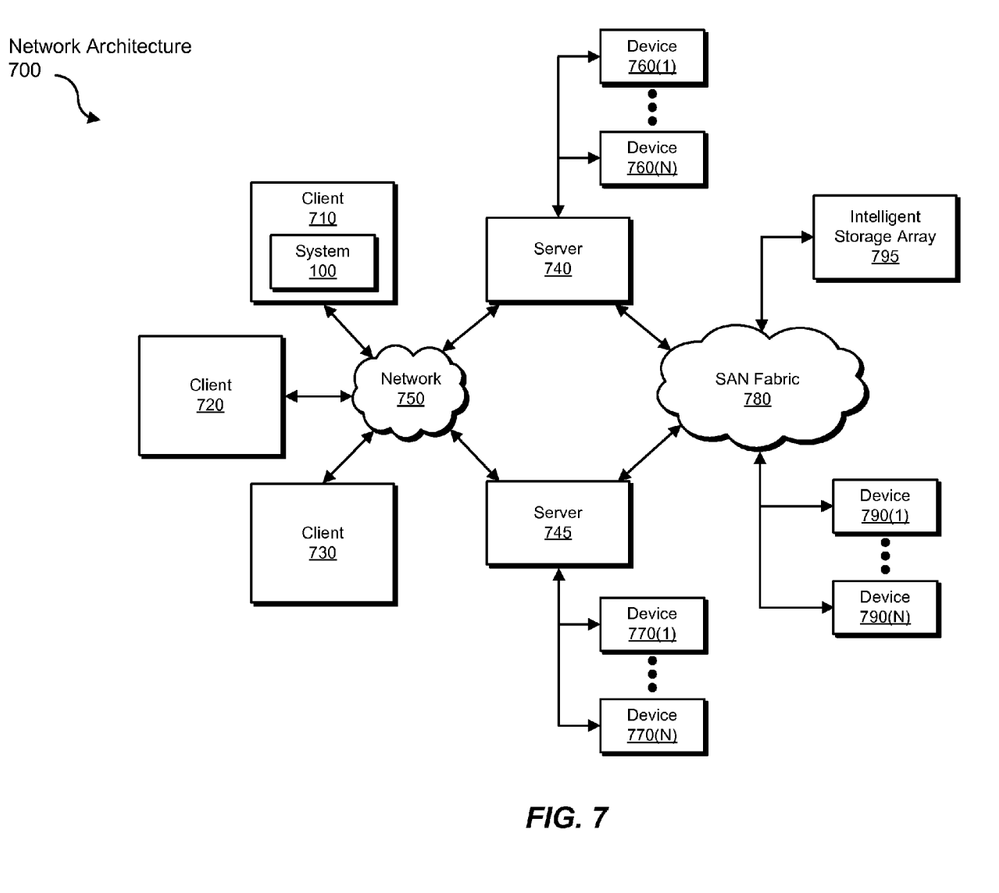
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for detecting text display manipulation attacks.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a file name to be transformed, transform the file name into a set of substrings, analyze the substrings for the presence of a specific character and/or for particular patterns, output a result of the analysis to a database or display device, and perform a security action based on the result of the analysis. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting text display manipulation attacks, at least a portion of the method being performed by a computing device comprising at least one processor, the method comprising:
    extracting a file name from a file that is under evaluation for malicious content;
    inspecting, by a software security system, the file name for at least one control character that is not displayed and causes systems to alter how visible text in the file name is displayed; determining, based on inspecting the file name, that the file name is written in a language that is categorized as being not associated with control characters; and comprises a manipulating control character that manipulates the display of a substring of the file name; and
    performing, by the software security system, a protective security action that, treats the file as comprising malicious content and prevents the file from executing malicious code based at least in part on the determination that the file name comprises the manipulating control character and is written in a language that is categorized as being not associated with control characters.

2. The method of claim 1, wherein performing the security action is also based on a determination that the file name comprises a substring that is categorized as associated with malicious files.

3. The method of claim 2, wherein performing the security action is further based on a determination that the substring matches an entry in a database that contains a list of substrings that are known to be included in the names of malicious files.

4. The method of claim 2, wherein performing the security action is further based on a determination that the substring matches a regular expression that represents substrings known to be included in the names of malicious files.

5. The method of claim 2, wherein the substring comprises one or more of:
    an aggregated plurality of file extensions;
    a file extension not located at the end of the file name; and
    a reversed file extension.

6. The method of claim 1, wherein determining that the file name is written in a language that is categorized as being not associated with control characters comprises determining that the file name is written in a language that is categorized, within a database, as being not associated with control characters.

7. The method of claim 1, wherein languages that are associated with control characters comprise:
    Hebrew;
    Chinese;
    Korean;
    Japanese; and
    Arabic.

8. The method of claim 1, further comprising extracting the file name in response to at least one of:
    a user attempting to access the file;
    a user downloading the file; and
    a security scan examining the file.

9. The method of claim 1, wherein the control character comprises a Unicode bi-directional control character.

10. The method of claim 1, wherein performing the security action comprises at least one of:
    preventing the file from executing;
    alerting a user that the file presents a security risk; and
    deleting the file.

11. A system for detecting text, display manipulation attacks, the system comprising:
    an extraction module, stored in a memory of the system, that extracts a file name from a file that is under evaluation for malicious content;
    an inspection module, stored in the memory, that inspects, through a software security system, the file name for at least one control character that is not displayed and causes systems to alter how visible text in the file name is displayed;
    a determination module, stored in the memory, that determines, based on inspecting the file name, that the file name is written in a language that is categorized as being not associated with control characters; and comprises a manipulating control character that manipulates the display of a substring of the file name;
    a security module, stored in the memory, that performs, through the software security system, a protective security action that treats the file as comprising malicious content and prevents the file from executing malicious code based at least in part on the determination that the file name comprises the manipulating control character and is written in a language that is categorized as being not associated with control characters; and
    at least one physical processor configured to execute the extraction module, the inspection module, the determination module, and the security module.

12. The system of claim 11, wherein the security module performs the security action based also on a determination that the file name comprises a substring that is categorized as associated with malicious files.

13. The system of claim 12, wherein the security module performs the security action based on a determination that the substring matches an entry in a database that contains a list of substrings that are known to be included in the names of malicious files.

14. The system of claim 12, wherein the security module performs the security action based on a determination that the substring matches a regular expression that represents substrings known to be included in the names of malicious files.

15. The system of claim 12, wherein the substring comprises one or more of:
- an aggregated plurality of file extensions;
- a file extension not located at the end of the file name; and
- a reversed file extension.

16. The system of claim 11, wherein the determination module determines that the file name is written in a language that is categorized, within a database, as being not associated with control characters.

17. The system of claim 11, wherein languages that are associated with control characters comprise:
- Hebrew;
- Chinese;
- Korean;
- Japanese; and
- Arabic.

18. The system of claim 11, wherein the extraction module extracts the file name in response to at least one of:
- a user attempting to access the file;
- a user downloading the file; and
- a security scan examining the file.

19. The system of claim 11, wherein the control character comprises a Unicode bi-directional control character.

20. A non-transitory computer-readable medium comprising one or more computer-readable instructions that, when executed by at least one processor of a computing device, cause the computing device to:
- extract a file name from a file that is under evaluation for malicious content;
- inspect, by a software security system, the file name for at least one control character that is not displayed and causes systems to alter how visible text in the file name is displayed;
- determine, based on inspecting the file name, that the file name is written in a language that is categorized as being not associated with control characters; and
- comprises a manipulating control character that manipulates the display of a substring of the file name; and
- perform, by the software security system, a protective security action that treats the file as comprising malicious content and prevents the file from executing malicious code based at least in part on the determination that the file name comprises the manipulating control character and is written in a language that is categorized as being not associated with control characters.

\* \* \* \* \*